Aug. 28, 1962      G. E. FLINN      3,051,017

REAR MOUNTED TRANSMISSION

Filed March 27, 1958      2 Sheets-Sheet 1

Inventor:
George E. Flinn
By: Keith J. Bleur Atty.

Aug. 28, 1962   G. E. FLINN   3,051,017
REAR MOUNTED TRANSMISSION
Filed March 27, 1958   2 Sheets-Sheet 2
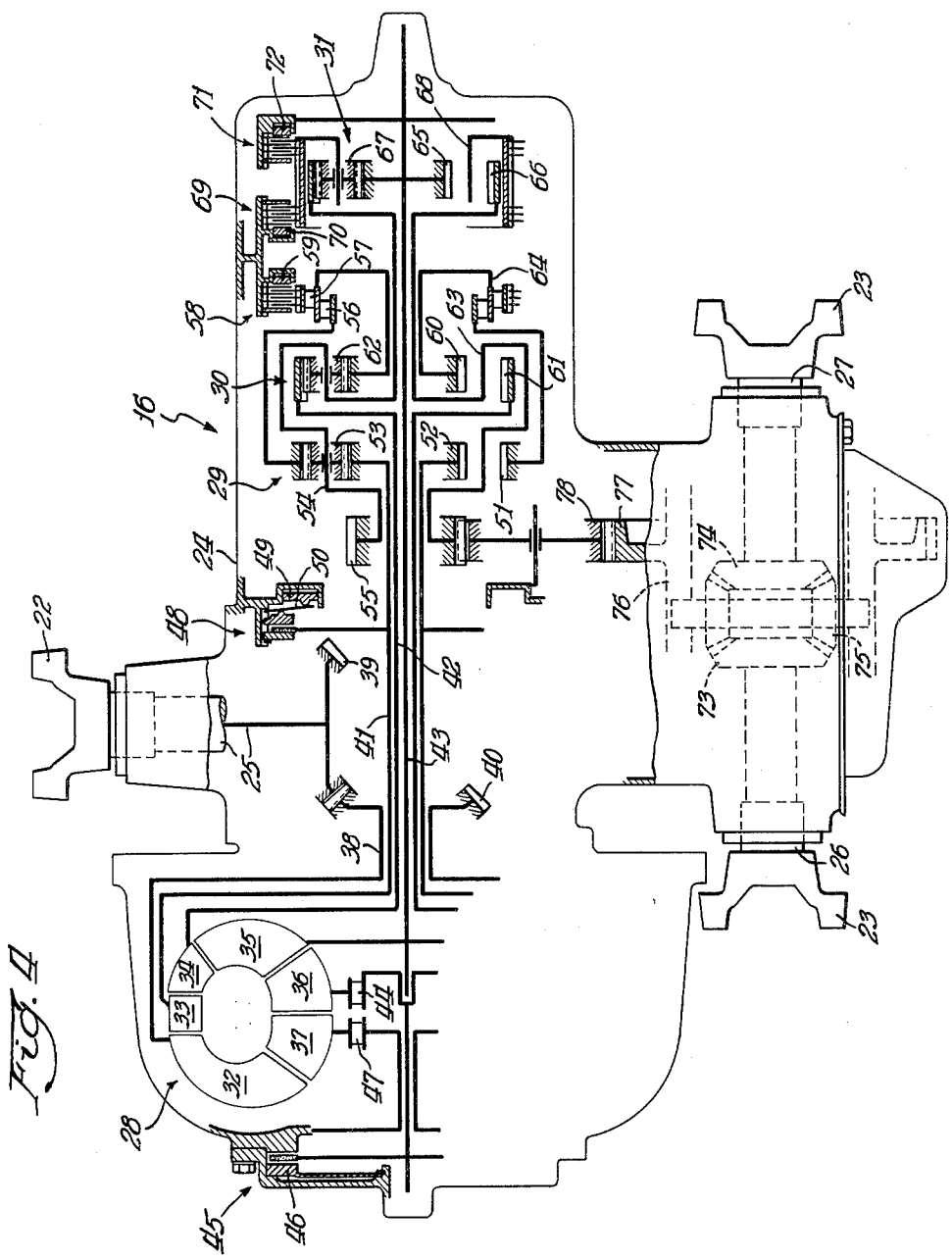
Inventor:
George E. Flinn
By: Keith T. Blower   Atty.

3,051,017
REAR MOUNTED TRANSMISSION
George E. Flinn, Muncie, Ind., assignor to Borg-Warner Corporation, Chicago, Ill., a corporation of Illinois
Filed Mar. 27, 1958, Ser. No. 724,399
3 Claims. (Cl. 74—677)

My invention relates to transmissions particularly for motor vehicles. More specifically, the invention relates to transmissions of the torque converter type which are suitable for mounting in the rear of a vehicle transversely of the vehicle.

It is an object of the present invention to provide an improved transmission of this type which provides a plurality of different speed ratio drives, with various driven elements of the hydraulic torque converter in the transmission successively becoming effective to provide higher ratio drives.

It is an object of the present invention to provide a transmission of this type in which one of the driven elements of the hydraulic torque converter providing one of the forward drive ratios is effectively connected with a motion reversing gear set, so that it in conjunction with the gear set provides a low ratio reverse drive to the output member of the transmission.

It is a more particular object to provide a transmission of this type utilizing two planetary gear sets, an element of one of which is braked for providing a forward drive and an element of the other of which is braked for providing a reverse drive. It is also an object to provide in such a transmission a torque converter that has at least two and alternately three driven elements, with the driven elements successively being effective for increasing the speed ratio in forward drive to the output member of the transmission.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIG. 1 is a plan view of the chassis of an automobile in which the transmissions of the invention may be installed;

FIGS. 2 and 3 are sectional views taken on lines 2—2 of FIG. 3 and 3—3 of FIG. 1, respectively;

FIG. 4 is a diagrammatic illustration of a transmission and differential assembly embodying the principles of the invention and mounted on the automobile chassis illustrated in FIG. 1;

FIG. 6 is a diagram showing the curvature of the various blades of the hydraulic torque converter which is a part of the transmission just mentioned.

Like characters of reference designate like parts in the several views.

Figure 1:
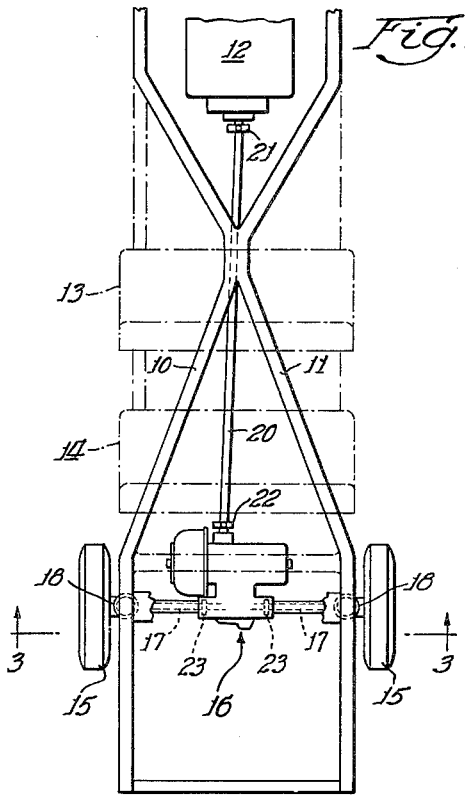
Figure 5:
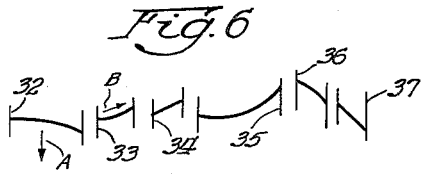
FIG. 5 is a table designating the various brakes and clutches of the transmission which are engaged to obtain various power transmitting conditions through the transmission.
Figure 3:
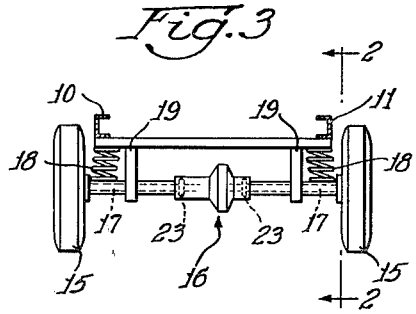
Figure 2:
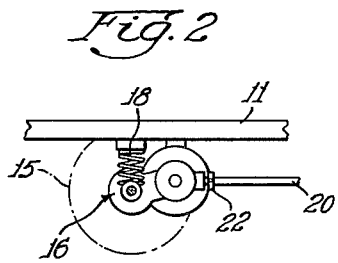

Referring now to FIG. 1, the automobile chassis illustrated therein may be seen to comprise side frame members 10 and 11 which are joined intermediate their ends to form an X-type of vehicle frame. The conventional automobile engine 12 is mounted adjacent the front end of the chassis, and the usual passenger seats 13 and 14 are fixed with respect to the chassis in the conventional manner.

Rear driving road wheels 15 are disposed adjacent the rear end of the chassis, and a transmission-differential assembly 16 is mounted with respect to the chassis between the road wheels 15. Each of the road wheels 15 is rotatably carried by a swing axle 17, and a coil spring 18 is disposed between each of the axles 17 and a portion of the vehicle chassis so as to swingingly mount the chassis with respect to the wheels 15. A limit strap 19 extends around each of the axles 17 and is fixed to the chassis adjacent the upper end of the adjoining spring 18 for holding the axle 17 against any other than vertical movement in the strap 19.

A propeller shaft 20 drivingly connects the engine 12 and the assembly 16, and universal joints 21 and 22 respectively connect the shaft 20 with the engine 12 and the assembly 16. Each of the swing axles 17 is connected by means of a universal joint 23 with the assembly 16 for driving the road wheel 15 but yet allowing vertical movement of the road wheels with respect to the vehicle chassis.

Referring to FIG. 4, the assembly 16 comprises a casing 24. An input shaft 25 is journalled in the casing at one side thereof, and a pair of output shafts 26 and 27 are journalled in the casing 24 substantially opposite the shaft 25. The shaft 25 is connected by means of the universal joint 22 to the propeller shaft 20, and each of the shafts 26 and 27 is connected by means of one of the universal joints 23 to the corresponding swing shaft 17.

The transmission comprises, in general, a hydraulic torque converter 28 and planetary gear sets 29, 30 and 31. The torque converter 28 comprises a pump or impeller element 32; first, second and third turbine or driven elements 33, 34 and 35; and first and second stators or reaction elements 36 and 37. All of these elements are bladed and are enclosed in a fluid tight housing, and the relative shapes of the blades of these elements at their mean flow lines are shown in FIG. 6.

The impeller 32 is driven from the shaft 25 through a sleeve shaft 38 and beveled gears 39 and 40 which are respectively fixed to the shafts 25 and 38. The first, second and third turbines 33, 34 and 35 are connected respectively with shafts 41, 42, and 43. The first stator 36 is connected through a one-way brake 44 and a friction brake 45 with the case 24. The brake 45 is fluid pressure engaged and comprises a piston 46. The stator 37 is connected directly with the case 24 through a one-way brake 47. A brake 48 is provided for the shaft 41, and this also is fluid pressure actuated and comprises a piston 49 which acts to engage the brake through a plurality of struts 50.

The planetary gear set 29 comprises a ring gear 51, a sun gear 52, planet gears 53 in mesh with the sun and ring gears, and a planet gear carrier 54. The sun gear is connected to the shaft 41; the carrier 54 is connected to a gear 55 which constitutes the output gear of the transmission; and the ring gear 51 is connected through a pair of one way brakes 56 and 57 and a friction brake 58 with the case 24. The brake 58 is fluid pressure engaged and comprises a piston 59.

The planet gear set 30 comprises a sun gear 60, a ring gear 61, planet gears 62 in mesh with the sun and ring gears, and a planet gear carrier 63. The carrier 63 is connected to the carrier 54 of the gear set 29; the ring gear 61 is connected to the shaft 42; and the sun gear 60 is connected to a sleeve 64 between the one-way brakes 56 and 57.

The planet gear set 31 comprises a sun gear 65, a ring gear 66, planet gears 67 in mesh with the sun and ring gears, and a carrier 68 for the planet gears. The ring gear 66 is connected to the carrier 63, and the sun gear 65 is connected to the shaft 43. A friction brake 69 is provided for the carrier 68 and includes a fluid pressure actuated piston 70. A friction clutch 71 is provided for connecting together the carrier 68 and the sun gear 65 and is fluid pressure actuated by means of a piston 72.

The differential is of conventional construction and comprises bevel gears 73 and 74 fixed respectively on the shafts 26 and 27, and bevel gears 75 in mesh with the gears 73 and 74 and rotatably carried on a gear carrier 76. A gear 77 is formed on the carrier 76 and meshes with a countershaft gear 78 that is also in mesh with the output gear 55 of the transmission.

In operation, the engine 12 drives the transmission through the propeller shaft 20 and universal joints 21 and 22, in particular driving the input shaft 25 and its gear 39. The transmission functions to drive the rear wheels 15 through the universal joints 23 and the axles 17.

The transmission may be operated in a drive range, a hill braking drive, and in a reverse drive. In the drive range, the brakes 58 and 45 are engaged, and the clutch 71 is engaged. The impeller 32 is driven from the shaft 25 through the gears 39 and 40 and the sleeve shaft 38. The vanes in the impeller 32 cause the fluid to flow toroidally through the torque converter from the impeller 32 successively through the first turbine element 33, the second turbine element 34, the third turbine element 35, the first stator 36 and the second stator 37, back into the impeller 32. The first turbine 33 thus has a torque impressed on it and begins rotation in the forward direction (in the same direction the impeller 32 is driven), driving the sun gear 52 through the sleeve shaft 41. The ring gear 51 is braked by means of the one way brakes 56 and 57 and the friction brake 58, so the planet gears 53 and carrier 54 planetate, at a reduced speed with respect to the sun gear 52, within the stationary ring gear 51. The carrier 54 is connected to the gear 55 constituting the output gear of the transmission, and this gear 55 drives through the countershaft gear 78 and the differential comprising the gears 73, 74, 75, and 77 to correspondingly drive the output shafts 26 and 27 at a low speed ratio.

As the speeds of the gear 55 and shafts 26 and 27 increase, the second turbine 34 begins to drive, and the first turbine 33 ceases its drive. The second turbine 34 drives the ring gear 61 of the planet gear set 30 through the sleeve shaft 42. The sun gear 60 of the gear set 30 is braked through the one way brake 57 and the friction brake 58, and the planet gears 62 and the carrier 63 thus planetate around the stationary sun gear 60. The carriers 63 and 54 are connected to the output gear 55 of the transmission, and the action of the second turbine 34 thus is to drive the gear 55 and the output shafts 26 and 27 at a higher speed ratio. The one way brake 56 which completes the low speed drive first described, releases during this second higher speed ratio drive.

As the speed of the gear 55 increases still further, the third turbine 35 takes over the drive, and the second turbine 34 at this time ceases driving. The third turbine 35 drives the sun gear 65 of the rear gear set 31 through the central shaft 43. The rear gear set 31 is locked up, so that all of its elements rotate as a unit, due to engagement of the clutch 71 connecting the carrier 68 and sun gear 65, and the ring gear 66 thus drives the output gear 55 at a high speed ratio drive through the carriers 63 and 54 connected to the ring gear 66. At this time, both of the brakes 56 and 57 free wheel or are released.

As the speed of the output gear 55 increases and the turbine elements 33, 34 and 35 successively take the drive, the stators 36 and 37 successively become released due to disengagement of the one-way brakes 44 and 47 with a change in the direction of the fluid impinging on the blades of the stators. The one-way brake 44 will first release, permitting the stator 36 to rotate in the forward direction, and the torque conversion in the torque converter 28 at this time decreases. Eventually, the one-way brake 47 releases so that both of the stators 36 and 37 rotate in the forward direction, and the converter 28 at this time is in its coupling range and does not produce torque conversion.

The brake 45 may be selectively released for any of the drives just described so that the torque converting function of the stator 36 is not utilized, in order to allow the vehicle engine to increase in speed and thus develop more horsepower. Additional power is thus transmitted to and through the transmission from the engine for providing added torque on the rear wheels 15 such as for passing another vehicle.

A vehicle braking condition may be completed through the transmission in which the shafts 26 and 27 and the output gear 55 braked to some extent for thereby braking the vehicle in descending a hill, for example—this condition is obtained by engaging the brake 48 and the clutch 71. The brake 48 functions to brake the first turbine 33 through the shaft 41 and a dynamic braking action occurs within the torque converter 28 due to the fluid from the first turbine 33 flowing in such direction to tend to drive the second and the third turbines 34 and 35 in the reverse direction. The second turbine under these conditions does not have any action because the friction brake 58 is released. The reverse torque on the third turbine 35, however, is transmitted through the center shaft 43 and the rear planetary gear set 31, which is locked up due to engagement of the clutch 71, and through the carriers 63 and 54 to the output gear 55 to thus provide a braking effect on the output gear 55 and shafts 25 and 27.

For reverse drive, the brakes 69 and 45 are engaged. The third turbine 35 has a forward torque impressed on it due to flow of the fluid within the converter 28 and drives the sun gear 65 of the planet gear set 31 through the center shaft 43. The brake 69 holds the carrier 68 against rotation, and the ring gear 66 of the gear set 31 is thereby driven at a reduced ratio in the reverse direction. The drive on the ring gear 66 is transmitted through the carriers 63 and 54 to the output gear 55. Under these conditions the first and second turbines 33 and 34 are ineffective. For reverse drive, also, the friction brake 45 may be released in order to cause the vehicle engine to operate at increased speed for increasing the output power of the engine.

As will be observed from FIG. 6, the blades of the turbines 33, 34, and 35 are all directed to discharge fluid in the direction opposite to that in which the impeller 32 is rotated as indicated by the arrow A, the direction of fluid flow being shown by the arrow B. The blades of the stators 36 and 37 are inclined in the opposite direction so as to direct fluid leaving the stators in the same direction that the impeller is driven.

My improved transmission advantageously provides gradually increasing speed ratios from the transmission input member to the transmission output member. The torque converter inherently provides such gradually increasing ratios, and the plurality of turbine elements successively drive in connection with the gearing to increase the range in which torque conversion exists in the torque converter as the vehicle speed increases.

I wish it to be understood that the invention is not to be limited to the specific constructions and arrangements shown and described, except only insofar as the claims may be so limited, as it will be apparent to those skilled in the art that changes may be made without departing from the principles of the invention.

I claim:

1. In a transmission, the combination of an input member, an output member, a hydraulic torque converter having an impeller or driving element driven by said input member and a stator or reaction element and first and second turbine or driven elements, a one way brake for said stator for preventing reverse rotation of the stator, first and second planet gear sets each having a first element thereof connected to said output member, means for connecting said first turbine element to a second element of said first gear set, a one way brake for a third element of said first gear set for providing a reduced speed forward drive power train from said first turbine element to said output member, means for connecting said second turbine element to a second element of said second gear set, a brake for a third element of said second gear set for providing a reverse drive through said second gear set from said second turbine element to said output member, and a friction clutch for locking together two elements of said second gear set for completing a direct drive from said second turbine element to said output member.

2. In a transmission, the combination of an input member, an output member, a hydrodynamic coupling device having an impeller or driving element driven from said input member and three turbine or driven elements, first and second and third planet gear sets, means for connecting a first one of said turbine elements with an element of said first gear set, means for braking another element of said first gear set to provide a change speed forward drive through the gear set from the turbine element connected thereto to said output member, means for connecting a second one of said turbine elements with an element of said second gear set, means for braking another element of said second gear set to provide another change speed forward drive through the gear set from the turbine element connected thereto to said output member, means for directly connecting the third of said turbine elements with said output member, means for connecting said last named turbine element with an element of said third gear set, and means for braking another element of said third gear set so as to provide a reverse drive from said last named turbine element through said third gear set to said output member.

3. In a transmission, the combination of an input member, an output member, a hydraulic torque converter having an impeller or driving element driven from said input member and three turbine or driven elements and a stator or reaction element, a one way brake for said stator element for holding it from reverse rotation, first and second and third planet gear sets each having an element connected to said output member, means for connecting a first one of said turbine elements with another element of said first gear set, a one way brake for a third element of said first gear set for providing a power train from said first turbine element through said first gear set to said output member, means for connecting a second of said turbine elements with another element of said second gear set, a one way brake for a third element of said second gear set for providing another different ratio power train from said second turbine element through said second gear set to said output member, means for connecting the third of said turbine elements to another element of said third gear set, a brake for a third element of said third gear set for providing a reverse drive through said third gear set from said third turbine element to said output member, and a clutch for locking together two of said elements of said third gear set for providing a one to one ratio drive from said third turbine element to said output member.

References Cited in the file of this patent
UNITED STATES PATENTS

| | | |
|---|---|---|
| 2,316,390 | Biermann | Apr. 13, 1943 |
| 2,861,474 | Moore | Nov. 25, 1958 |
| 2,884,809 | Moore | May 5, 1959 |